(12) United States Patent
Chai et al.

(10) Patent No.: US 10,437,784 B2
(45) Date of Patent: Oct. 8, 2019

(54) METHOD AND SYSTEM FOR ENDURANCE ENHANCING, DEFERRED DEDUPLICATION WITH HARDWARE-HASH-ENABLED STORAGE DEVICE

(71) Applicant: SK hynix Inc., Gyeonggi-do OT (KR)

(72) Inventors: Zhenchuan Chai, Milpitas, CA (US); Indra G. Harijono, San Jose, CA (US); Hwansoo Han, Cupertino, CA (US)

(73) Assignee: SK hynix Inc., Gyeonggi-do (KR)

( * ) Notice: Subject to any disclaimer, the term of this patent is extended or adjusted under 35 U.S.C. 154(b) by 712 days.

(21) Appl. No.: 15/011,017

(22) Filed: Jan. 29, 2016

(65) Prior Publication Data

US 2016/0224589 A1  Aug. 4, 2016

Related U.S. Application Data

(60) Provisional application No. 62/110,267, filed on Jan. 30, 2015.

(51) Int. Cl.
*G06F 16/174* (2019.01)
*G06F 3/06* (2006.01)
*H04L 29/08* (2006.01)
*G06F 16/13* (2019.01)

(52) U.S. Cl.
CPC ........ *G06F 16/1748* (2019.01); *G06F 3/0641* (2013.01); *G06F 16/137* (2019.01); *H04L 67/1097* (2013.01)

(58) Field of Classification Search
CPC ......... G06F 17/30156; G06F 17/30312; G06F 16/1748; G06F 16/137; G06F 3/0641
See application file for complete search history.

(56) References Cited

U.S. PATENT DOCUMENTS

| | | | |
|---|---|---|---|
| 7,539,710 B1 | 5/2009 | Haustein et al. | |
| 7,814,149 B1 * | 10/2010 | Stringham | G06F 16/1748 709/203 |
| 7,840,537 B2 * | 11/2010 | Gokhale | G06F 11/1453 707/652 |
| 8,204,868 B1 * | 6/2012 | Wu | G06F 17/30156 707/693 |
| 8,281,066 B1 * | 10/2012 | Trimmer | G06F 3/0641 711/103 |
| 8,326,897 B2 * | 12/2012 | Butterworth | G06F 11/1435 707/822 |
| 8,620,886 B1 * | 12/2013 | Madan | G06F 17/00 707/698 |

(Continued)

FOREIGN PATENT DOCUMENTS

KR    1020140141348    12/2014

*Primary Examiner* — Robert W Beausoliel, Jr.
*Assistant Examiner* — Susan F Rayyan
(74) *Attorney, Agent, or Firm* — IP & T Group LLP (57) ABSTRACT

A storage system may include at least one storage device and a server. The storage device may store an incoming data, calculate a hash value for the incoming data, and store the hash value as meta data. The server may provide the incoming data to the storage device, read the meta data from the storage device, determine whether the meta data is duplicate in the table, and perform a deduplication process regarding the incoming data based on the determination result.

19 Claims, 8 Drawing Sheets

(56) References Cited

U.S. PATENT DOCUMENTS

| | | | |
|---|---|---|---|
| 8,738,577 B1* | 5/2014 | Gardner | G06F 17/30159 707/640 |
| 8,943,024 B1* | 1/2015 | Gardner | G06F 17/30067 707/640 |
| 8,953,265 B1* | 2/2015 | Ma | G11B 27/36 360/31 |
| 9,418,131 B1* | 8/2016 | Halevi | G06F 16/137 |
| 9,449,011 B1* | 9/2016 | Chen | G06F 16/1748 |
| 9,946,724 B1* | 4/2018 | Ghosh | G06F 16/1748 |
| 2008/0294696 A1* | 11/2008 | Frandzel | G06F 3/0608 |
| 2008/0301134 A1* | 12/2008 | Miller | G06F 16/1748 |
| 2009/0254609 A1* | 10/2009 | Wideman | G06F 3/0608 709/203 |
| 2010/0235333 A1* | 9/2010 | Bates | G06F 17/30156 707/692 |
| 2011/0145207 A1* | 6/2011 | Agrawal | G06F 16/1748 707/692 |
| 2011/0178996 A1* | 7/2011 | Pendlebury | G06F 11/1453 707/692 |
| 2011/0191305 A1* | 8/2011 | Nakamura | G06F 3/0608 707/692 |
| 2013/0018853 A1* | 1/2013 | Jayaraman | G06F 3/0641 707/692 |
| 2013/0290274 A1* | 10/2013 | Patil | G06F 11/1453 707/690 |
| 2014/0143213 A1* | 5/2014 | Tal | G06F 16/2365 707/692 |
| 2014/0195749 A1* | 7/2014 | Colgrove | G06F 3/0619 711/159 |
| 2014/0227772 A1* | 8/2014 | Guzman | G01N 27/44743 435/287.9 |
| 2014/0229451 A1* | 8/2014 | Venkatesh | G06F 17/30156 707/692 |
| 2014/0229452 A1* | 8/2014 | Serita | G06F 17/30156 707/692 |
| 2014/0237202 A1* | 8/2014 | Yamamoto | G06F 3/0641 711/162 |
| 2014/0281155 A1* | 9/2014 | Cohen | G06F 3/0619 711/103 |
| 2014/0358872 A1* | 12/2014 | Shin | G06F 17/30156 707/692 |
| 2014/0359043 A1* | 12/2014 | Gao | G06F 15/167 709/212 |
| 2015/0012503 A1* | 1/2015 | Akirav | G06F 16/1748 707/692 |
| 2015/0212900 A1* | 7/2015 | Hayasaka | G06F 11/1453 707/652 |
| 2016/0063024 A1* | 3/2016 | Zheng | G06F 16/1748 707/692 |
| 2016/0196320 A1* | 7/2016 | Borowiec | G06F 17/30153 707/624 |

* cited by examiner

METHOD AND SYSTEM FOR ENDURANCE ENHANCING, DEFERRED DEDUPLICATION WITH HARDWARE-HASH-ENABLED STORAGE DEVICE

CROSS-REFERENCE TO RELATED APPLICATIONS

This application claims the benefit of U.S. Provisional Application No. 62/110,267 filed Jan. 30, 2015, the entire contents of which are incorporated herein by reference.

BACKGROUND

1. Field

Exemplary embodiments of the present disclosure relate to a system including a storage device and a method for managing data stored in the storage device.

2. Description of the Related Art

In a memory system or a storage system including storage devices, various data management techniques are considered for improvement of storage capacity and performance. Data deduplication is the process of eliminating duplicate copies of data and replacing them with pointers to a single copy. Reduplication typically serves two main purposes: reducing the amount of storage capacity required to store data, and reducing the network bandwidth required for performing backups or replication. Most existing deduplication schemes encounters many performance issues.

SUMMARY

Embodiments of the present disclosure are directed to a storage system including a storage device and a deduplication method for data stored in the storage device.

Aspects of the invention include a system for data deduplication. The system may include at least one storage device and a server. The storage device may store an incoming data, calculate a hash value for the incoming data, and store the hash value as meta data. The server may provide the incoming data to the storage device, read the meta data from the storage device, determine whether the meta data is duplicate in the table, and perform a deduplication process regarding the incoming data based on the determination result.

Further aspects of the invention include a method for data deduplication. The method may include providing, by a server, an incoming data to at least one storage device; storing, by the storage device, the incoming data; calculating, by the storage device, a hash value for the incoming data; storing, by the storage device, the hash value as meta data; reading, by the server, the meta data from the storage device; determining, by the server, whether the meta data is duplicate in the table; and performing by the server, deduplication process regarding the incoming data based on the determination result.

Still further aspects of the invention include a storage server for data deduplication. The storage server may include a first unit and a second unit. The first unit may be suitable for receiving an incoming data, and providing the incoming data to at least one storage device. The second unit may be suitable for reading meta data as a hash value for the incoming data from the storage device, determining whether the meta data is duplicate in the table, and performing a deduplication process regarding the incoming data in the storage device based on the determination result.

Additional aspects of the invention include a storage server for data deduplication. The storage server may include an internal storage device mounted on the server, and a processing unit. The internal storage device may be suitable for storing an incoming data, calculating a hash value for the incoming data, and storing the hash value as meta data. The processing unit may be suitable for reading the meta data from the internal storage device, determining whether the meta data is duplicate in the table, and performing a deduplication process regarding the incoming data based on the determination result.

DETAILED DESCRIPTION

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

Figure 1:
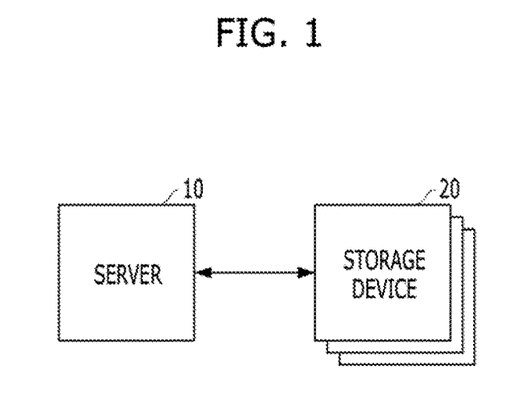
FIG. 1 is a block diagram of a storage system.

FIG. 1 illustrates a block diagram of a storage system or a memory system.

Referring to FIG. 1, the storage system may include a server (or memory controller) 10 and a plurality of storage devices 20. The storage devices 20 may store data, and the server 10 may control storage of data in the storage devices 20.

The storage system may operate in response to a request from a host (not shown), and in particular, store data to be accessed by the host. In other words, the memory system may be used as a main memory system or an auxiliary memory system of the host. The host may include, for example, a portable electronic device such as a mobile phone, an MP3 player and a laptop computer or an electronic device such as a desktop computer, a game player, a TV a projector, etc.

The storage devices 20 may be implemented with a volatile memory device such as a dynamic random access memory (DRAM) and a static random access memory (SRAM) or a non-volatile memory device such as a read only memory (ROM), a mask ROM (MRM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The storage devices 20 may be implemented with any one of various kinds of storage devices such as a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and so forth.

The storage devices 20 may retain stored data when power supply is interrupted, store the data provided from the host during a write operation, and provide stored data to the host during a read operation. In some embodiments the storage devices 20 may be non-volatile memory devices, for example a flash memory. The storage devices 20 may include a plurality of memory blocks. Each of the memory blocks may include a plurality of pages. Each of the pages may include a plurality of memory cells to which a plurality of word lines (WL) are electrically coupled.

The server 10 may control the storage devices 20 in response to a request from the host. The server 10 may provide the data read from the storage devices 20 to the host, and store the data provided from the host into the storage devices 20. To this end, the server 10 may control overall operations of the storage devices 20, such as read, write, program, and erase operations.

In some embodiments, the server 10 may include a host interface unit for interfacing with the host, an error correction code (ECC) unit for detecting and correcting errors in the data read from the storage devices 20, a power management unit (PMU) for providing and managing power for the server 10, a memory interface between the server 10 and the storage devices 20, a memory for serving as a working memory of the server 10, and a processor for controlling general operations of the storage system.

In the storage system as described above, data management techniques such as data deduplication may be considered for improvement of storage capacity and performance. Data deduplication usually starts with comparing two pieces of data to identify duplicates. It would be impractical to compare entire data. Therefore, a hash value, also called fingerprint which is a small number generated over whole piece of data, is used to search and compare for identifying data duplicates.

As for when to perform deduplication, deduplication technology may be classified into two schemes of inline deduplication and post deduplication.

In the inline deduplication, deduplication operations such as the hashing the data, comparing the fingerprint values, and re-referencing data, are performed as the data are being written to the storage system. The advantage of the inline deduplication is that it does not need the duplicate data to actually be saved to the storage device. The disadvantage of this scheme is that significant system resources, in terms of memory and computing power, are required to perform intensive hashing calculation.

The post deduplication, instead of performing deduplication on the fly, postpones all those operations by first storing incoming data to the storage system, and deduplicating them later.

Although the post-deduplication relieves the server from heavy in-line workload, it overwhelms the server when it starts the deduplication process, which needs to rescan back all the data, and calculate the fingerprints, etc.

Figure 2:
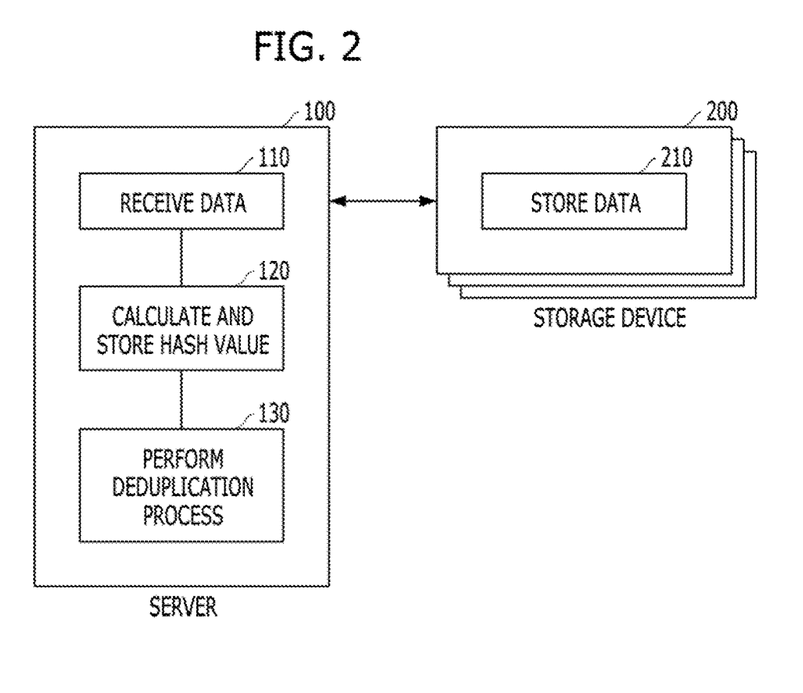
FIG. 2 is a block diagram of a storage system for a deduplication process.
Figure 3:
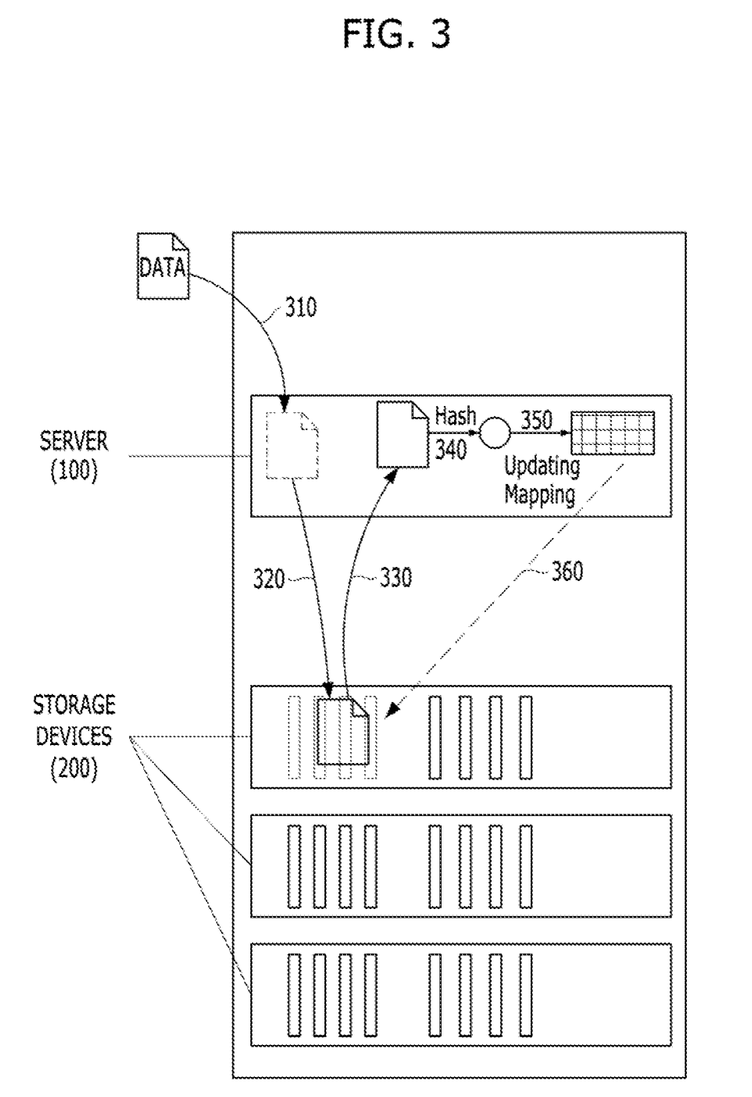
FIG. 3 is a diagram illustrating a deduplication process performed by a storage system.

For a post deduplication process, a block diagram of a storage system and a deduplication process performed by the storage system are depicted in FIGS. 2 and 3, respectively.

Referring to FIG. 2, a storage system may include a server 100 and storage devices 200. For example, the server 100 and the storage devices 200 correspond to the server 10 and the storage devices 20 shown in FIG. 1, respectively.

The server 100 is responsible for handling read/write request, protocol handling, etc., while the storage devices 200 are responsible for storing data. The server 100 may include a first unit 110, second unit 120 and a third unit 130. The first unit 110 may receive incoming data (e.g., write data) from a host (not shown). The second unit 120 may calculate and store a hash value (or fingerprint) for the incoming data. The third unit 130 may perform a deduplication process (e.g., post deduplication process). Each of the storage devices 200 may include a unit 210 for storing data received from the server 100.

Referring to FIG. 3, various steps may be performed for the post deduplication. At step 310, an incoming new data is received by the storage server 100. At step 320, the server 100 saves the incoming data to the storage devices 200. When the server 100 is scheduled to do post-deduplication, at step 330, the server 100 reads the newly saved data from the storage devices 200. At step 340, the server 100 calculates a hash value for the read data. At step 350, the server 100 looks up and updates a mapping table using the calculated hash value. The mapping table stores mapping relations between a plurality of data and a plurality of hash values. At step 350, if needed, the server 100 deletes the duplicated copy of the newly saved data in the storage devices 200.

In the steps of FIG. 3 described above, step 330 may cause a lot of data traffic within the storage system, and step 340 may need the server 100 (e.g., a central processing unit (CPU) of the server 100) to be fully occupied to calculate fingerprints.

As described above, calculating fingerprints may be CPU-intensive operation, which usually significantly lowers the throughput of the storage system adopting the inline deduplication scheme. Therefore, many storage systems may use the post deduplication scheme. However, most post deduplication schemes still may encounter many performance issues when the deduplication is being performed. The data needs to be scanned back and calculated for fingerprints by the server.

Accordingly, there is a need to provide a scheme in a storage system for endurance enhancing coalesced deduplication. The storage system uses a hardware-hash-enabled storage device to buffer or store incoming data. The storage device may offload the CPU-intensive hashing operations and buffer the data. The system may, therefore, defer the deduplication process to when the server is available. The storage system also reduces the traffic between the server and the storage device and therefore increases the performance.

Figure 4:
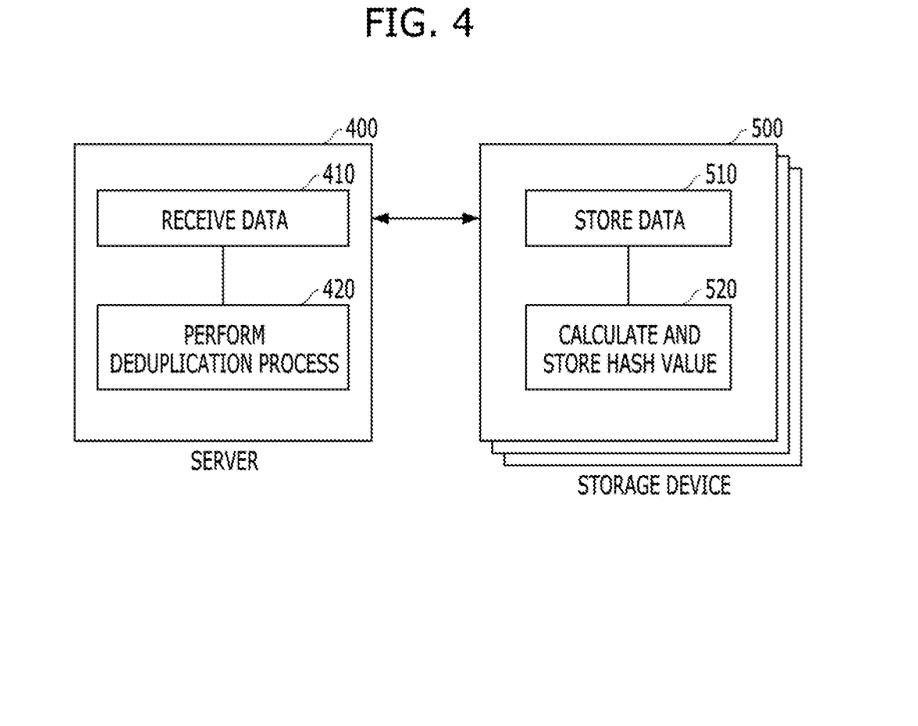
FIG. 4 is a block diagram of a storage system for a deduplication process in accordance with embodiments of the present disclosure.

FIG. 4 is a block diagram of a storage system for a deduplication process in accordance with embodiments of the present disclosure. The embodiment of the storage system shown in FIG. 4 is for illustration only. Other embodiments of the storage system could be used without departing from the scope of this disclosure.

Referring to FIG. 4, a storage system may include a server 400 and storage devices 500, For example, the server 400 and the storage devices 500 correspond to the server 10 and the storage devices 20 shown in FIG. 1, respectively.

The server 400 may handle read/write requests, execute communication protocols and maintain a deduplication mapping table. The deduplication mapping table stores information regarding relations between a plurality of meta data and a plurality of data. The storage devices 500 may store data. Each of the storage devices 500 may include a first unit 510 and a second unit 520. The first unit 510 may store data received from the server 400. The second unit 520 may calculate and store a hash value (or fingerprint) for the incoming data as meta data.

The server 400 may include a first unit 410 and a second unit 420. The first unit 410 may receive incoming data (e.g., write data) from a host (not shown) and provide the incoming data to the storage devices 500. The second unit 420 may perform a deduplication process (e.g., post deduplication process).

In some embodiments, the second unit 420 may read the meta data from the storage devices 500, update the deduplication mapping table with the meta data, determine whether the meta data is duplicate in the table, and perform the deduplication process regarding the incoming data based on the determination result. If the meta data is duplicate in the table, the second unit 420 may delete the duplicated copy the incoming data in the storage devices 500.

Figure 5:
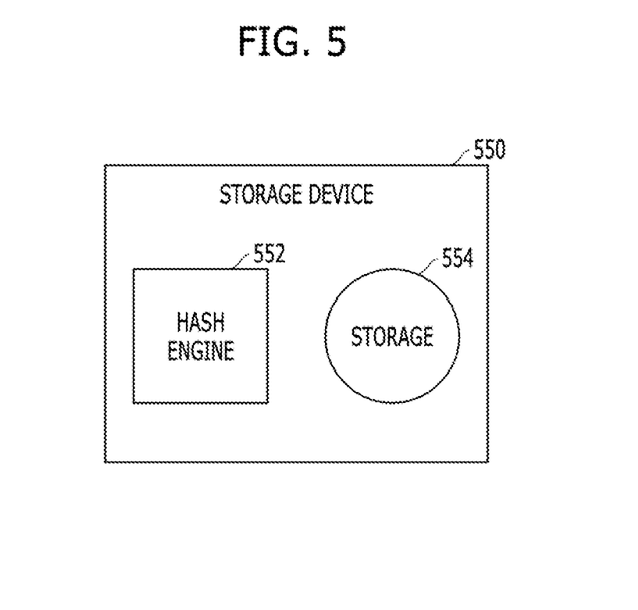
FIG. 5 is a block diagram of a storage device in accordance with an embodiment of the present disclosure.

FIG. 5 is a block diagram of a storage device in accordance with an embodiment of the present disclosure. The embodiment of the storage device shown in FIG. 5 is for illustration only. Other embodiments of the storage device could be used without departing from the scope of this disclosure.

Referring to FIG. 5, a storage device 550 may include a hash engine 552 and a storage 554. For example, the storage device 550 may correspond to storage devices 500 of FIG. 4. The hash engine 552 and the storage 554 correspond to the second unit 520 and the first unit 510 shown in FIG. 4, respectively. The hash engine 552 may calculate the hash value for the incoming data. The storage 554 may store the incoming data and the meta data. In an embodiment, the storage device 550 may be a solid state drive (SSD). The storage device 550 not only serves to save data, but also help to offload the hash calculation from a storage server (e.g., 400 in FIG. 4) by automatically computing the fingerprints when data are being written.

Figure 6:
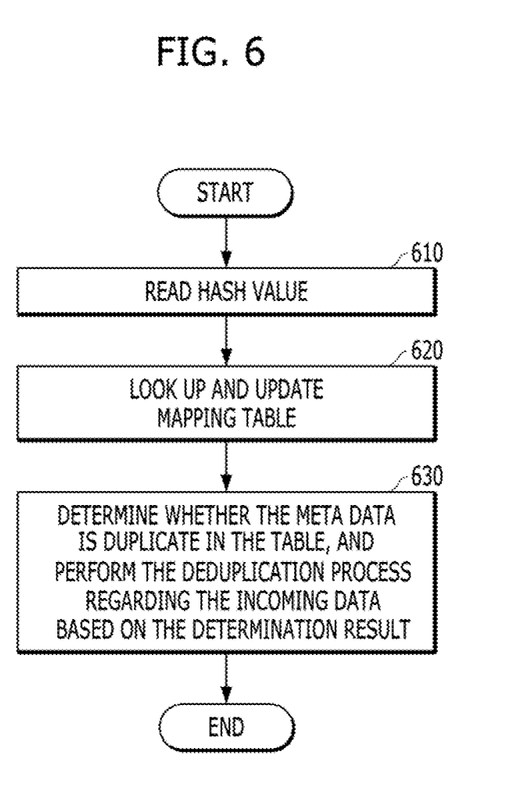
FIG. 6 is a flowchart illustrating steps in a deduplication process in accordance with an embodiment of the present disclosure.

FIG. 6 is a flowchart illustrating a deduplication process in accordance with an embodiment of the present disclosure. The embodiment of the deduplication process shown in FIG. 6 is for illustration only. Other embodiments of the deduplication process could be used without departing from the scope of this disclosure. For example, the deduplication process may be performed by the second unit 420 of the server 400 of FIG. 4.

Referring to FIG. 6, at block 610, the server 400 may read meta data as a hash value from the storage 554 of the storage devices 500. At block 620, the server 400 may look up and update the deduplication mapping table with the meta data. After that, at block 630, the server 400 may determine whether the meta data is duplicate in the table, and perform the deduplication process regarding the incoming data based on the determination result. For example, if the meta data is duplicate in the table, the server 400 may delete the duplicated copy of the incoming data in the storage 554 of the storage device 550.

Figure 7:
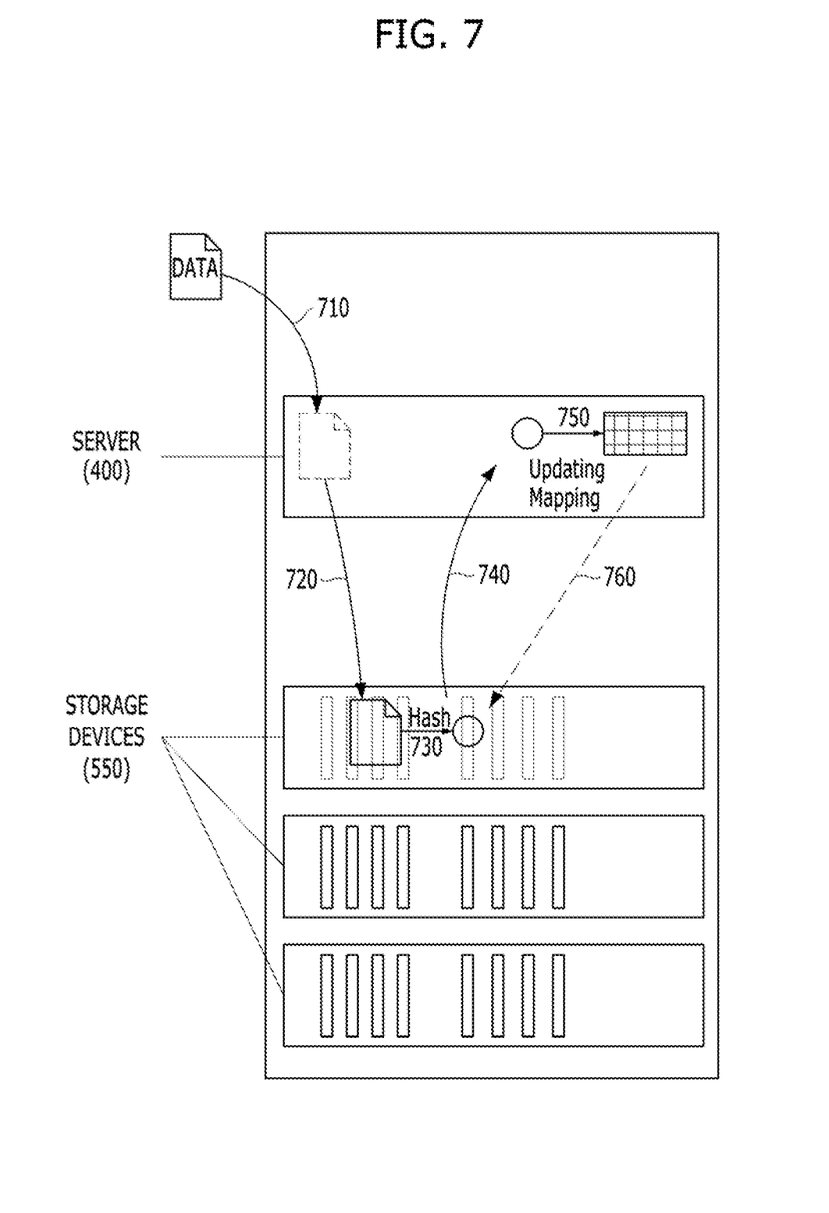
FIG. 7 is a diagram illustrating a deduplication process performed by a storage system in accordance with an embodiment of the present disclosure.

FIG. 7 is a diagram illustrating steps in a deduplication process performed by a storage system in accordance with an embodiment of the present disclosure. The embodiment of steps in the deduplication process shown in FIG. 7 is for illustration only. Other embodiments of steps in the deduplication process could be used without departing from the scope of this disclosure.

Referring to FIG. 7, various steps may be performed for the post deduplication. At step 710, an incoming new data is received by the storage server 400. At step 720, the server 400 saves the incoming data to one of the storage devices 550.

At step 730, on receiving the incoming data, one of the storage devices 550 automatically calculates fingerprints (or hash value) for the incoming data, and saves the fingerprints as meta data.

When the server 400 is scheduled to do post-deduplication at step 740, the server 400 reads the newly generated fingerprints from the storage devices 550. At step 750, the server 400 looks up and updates a mapping table using the read fingerprints. The mapping table stores mapping relations between a plurality of data and a plurality of hash values (or fingerprints, plurality of meta data, etc.). At step 760, if needed, the server 400 deletes the duplicated copy of the newly saved incoming data in the storage devices 550.

Compared with the post deduplication process as shown in FIG. 3, the hardware-hash-enabled devices 550 may offload the computation-intensive hashing from the server 400, and remove the traffic used to read back the data. Therefore, the overall performance may be greatly increased.

Figure 8A:
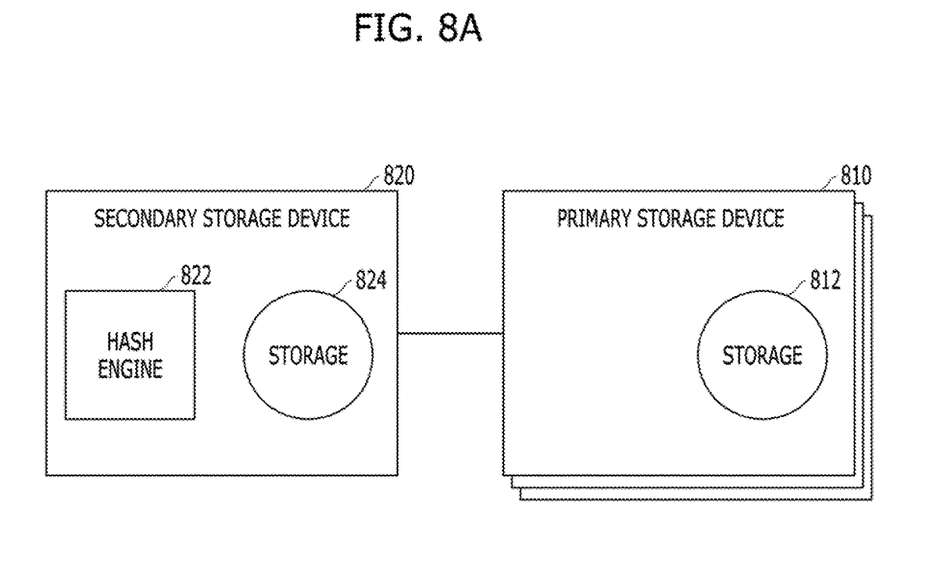
FIGS. 8A and 8B are block diagrams of storage devices in accordance with another embodiment of the present disclosure.
Figure 8B:
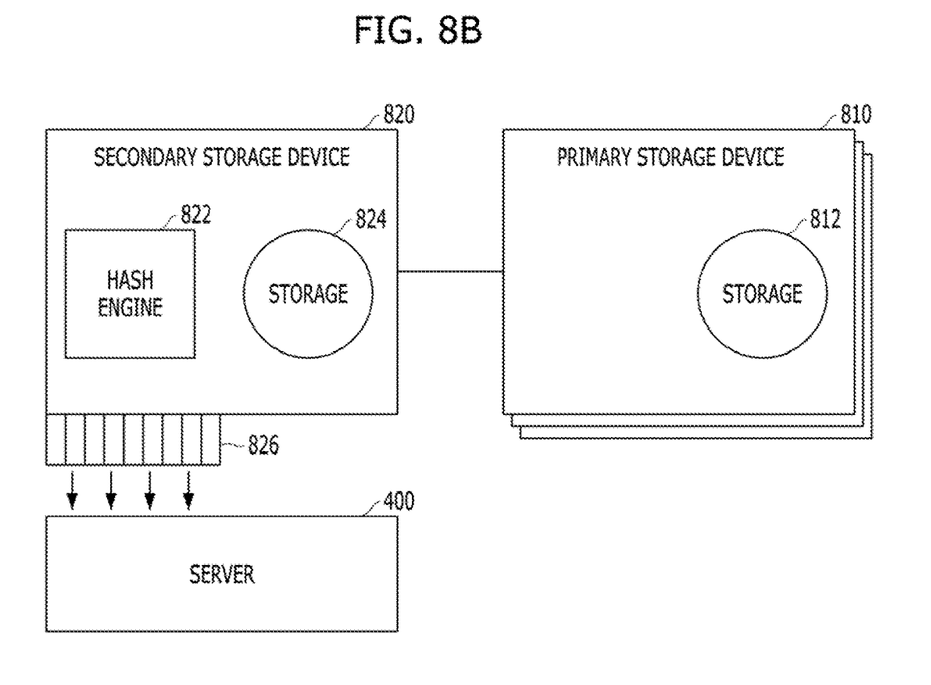

FIG. 8A and FIG. 8B are block diagrams of storage devices in accordance with another embodiment of the present disclosure. The embodiment of the storage devices shown in FIGS. 8A and 8B is for illustration only. Other embodiments of the storage devices could be used without departing from the scope of this disclosure.

Referring to FIG. 8A, there are two kinds of storage devices including primary storage devices 810 and a secondary storage device 820. For example, the primary storage devices 810 and the secondary storage device 820 may be storage devices 500 of FIG. 4. Each of the primary storage devices 810 may include a storage 812, and the secondary storage device 820 may include a hash engine 822 and a storage 824. For example, the storage 812 corresponds to the first unit 510 in FIG. 4, and the hash engine 822 and the storage 824 correspond to the second unit 520 in FIG. 4. The storage 812 may store the incoming data. The hash engine 822 may calculate the hash value for the incoming data. The storage 824 may store the incoming data and the meta data. In an embodiment, the secondary storage device 820 may be a non-volatile random access memory (NVRAM) card.

Referring to FIG. 8B if the secondary storage device 820 is the NVRAM card, the secondary storage device 820 is mounted on the server 400 through a connecting unit 826. The secondary storage device 820 serves as a data buffer and may calculate fingerprints. In some embodiments, the server 400 may maintain a data block mapping table, a fingerprint table, and an address pointer into the data blocks of the secondary storage device 820, The data block mapping table and the fingerprint table may be implemented with a single deduplication mapping table. The address pointer may be used to indicate the boundary between the data which has been processed and data which has not. Therefore, data writing, deduplication, and flushing data to the primary storage device 820 may be performed asynchronously.

Figure 9:
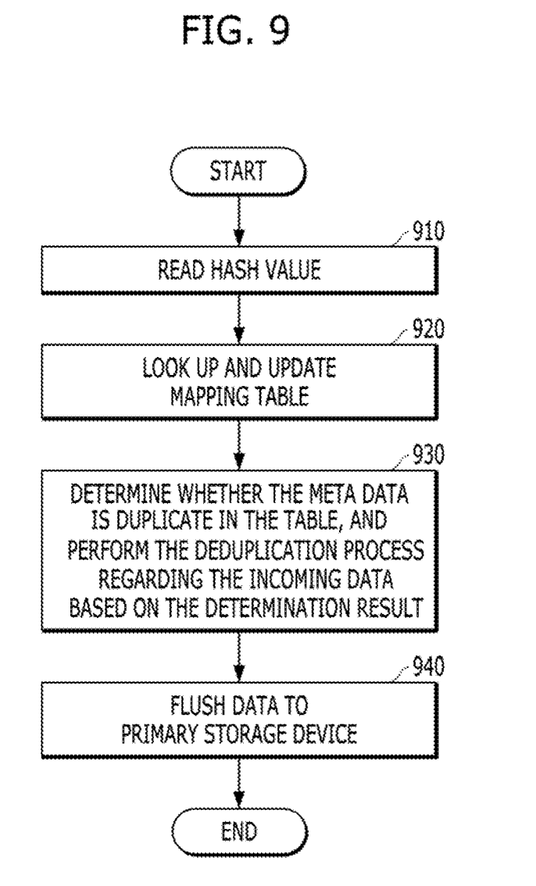
FIG. 9 is a flowchart illustrating steps in a deduplication process in accordance with another embodiment of the present disclosure.

FIG. 9 is a flowchart illustrating a deduplication process in accordance with another embodiment of the present disclosure. The embodiment of the deduplication process shown in FIG. 9 is for illustration only. Other embodiments of the deduplication process could be used without departing from the scope of this disclosure. For example, the deduplication process may be performed by the second unit 420 of the server 400 in FIG. 4 equipped with the secondary storage device 820 in FIG. 8B.

Referring to FIG. 9, at block 910, the server 400 may read meta data as a hash value from the storage 824 of the secondary storage device 820 in FIG. 8B. At block 920, the server 400 may look up and update the deduplication mapping table with the meta data. After that, the server 400, at block 930, may determine whether the meta data is duplicate in the table, and perform the deduplication process regarding the incoming data based on the determination result. For example, if the meta data is duplicate in the table the server 400 may remove the duplicated copy of the incoming data in the storage 824 of the secondary storage device 820. Finally, at block 940, the server 400 may flush the incoming data to the primary storage device 810 in FIG. 8B.

Figure 10:
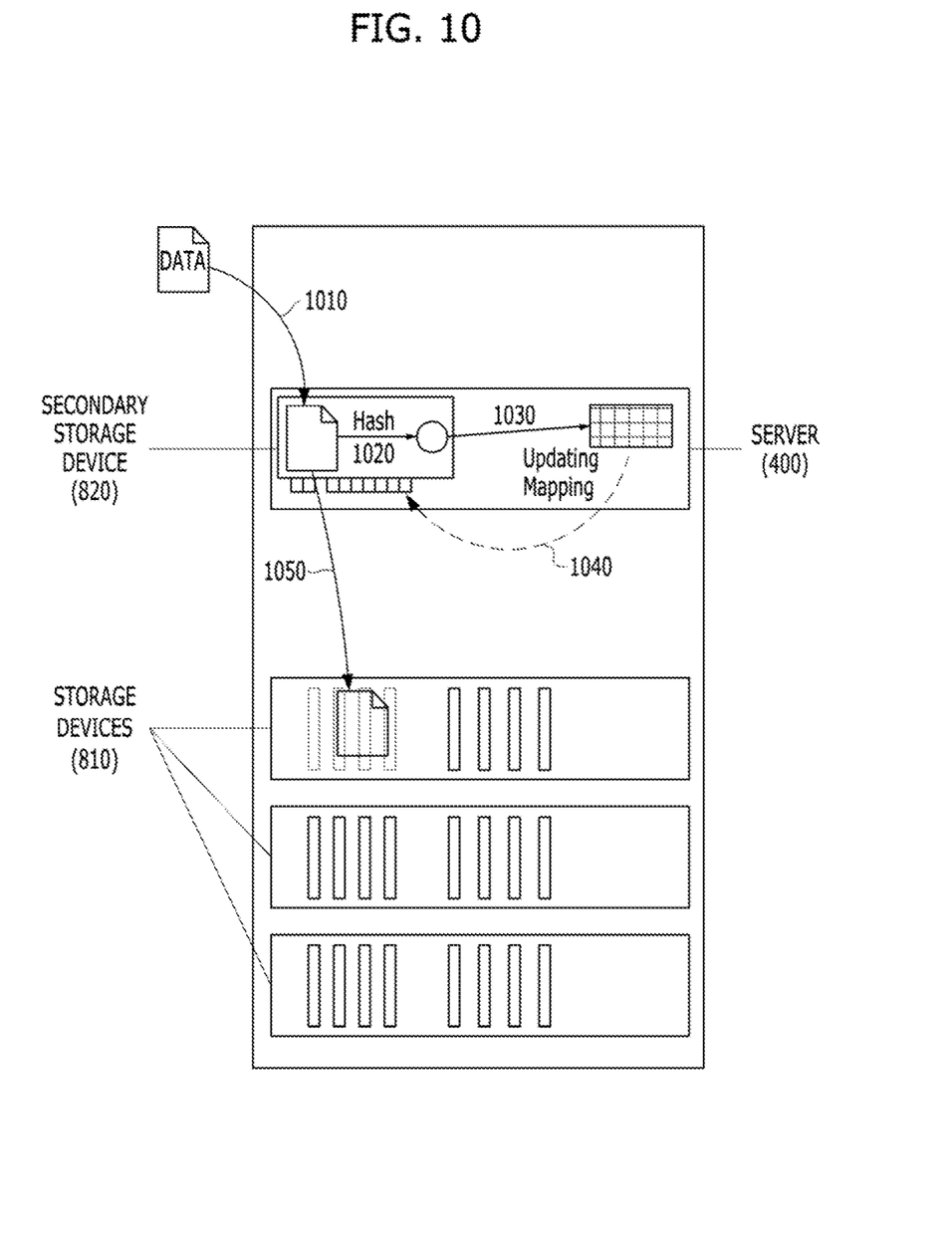
FIG. 10 is a diagram illustrating a deduplication process performed by a storage system in accordance with another embodiment of the present disclosure.

FIG. 10 is a diagram illustrating steps in a deduplication process performed by a storage system in accordance with another embodiment of the present disclosure. The embodiment of steps in the deduplication process shown in FIG. 10 is for illustration only. Other embodiments of steps in the deduplication process could be used without departing from the scope of this disclosure.

Referring to FIG. 10, various steps may be performed for the post deduplication. At step 1010, an incoming new data is received by the storage server 400, and the server 400 saves the incoming data to the secondary storage device 820.

At step 1020, on receiving the incoming data, the secondary storage device 820 automatically calculates fingerprints (or hash value) for the incoming data, and saves the fingerprints locally as meta data.

When the server 400 is freed up or the secondary storage device 820 is full, at step 1030 the server 400 starts from the data pointed by the pointer, reads only the fingerprints from the secondary storage device 820, looks up and updates a mapping table using the read fingerprints. The mapping table stores mapping relations between a plurality of data and a plurality of hash values. At step 1040, if needed, the server 400 removes the duplicated copy of the incoming data in the secondary storage device 820. After that, at step 1050, the server 400 may flush (or transfer) the incoming data to the primary storage device 810.

Except for offloading the fingerprint calculation and reducing the internal traffic, the benefits of the scheme shown in FIGS. 8A to 10 also include prolonging the primary storage device's life time, if the storage device is all flash array. The flash storage medium may be gradually worn out whenever data are written on to it. Therefore, removing the duplicated data before write them to the primary storage device may increase the life span of the flash storage medium.

While the present invention has been particularly shown and described with reference to exemplary embodiments thereof, it will be understood by those of ordinary skill in the art that various changes in form and details may be made therein without departing from the spirit and scope of the present invention as defined by the following claims. Thus, the foregoing is by way of example only and is not intended to be limiting. For example, any numbers of elements illustrated and described herein are by way of example only. The present invention is limited only as defined in the following claims and equivalents thereof.

What is claimed is:

1. A system comprising:
at least one storage device configured to store an incoming data, calculate a hash value for the incoming data, and store the hash value as meta data; and
a server configured to provide the incoming data to the storage device, wherein, when a later-scheduled post-deduplication operation is to be performed, as part of the later-scheduled post-deduplication operation, the server reads the meta data from the storage device, determines whether the meta data is duplicate in a mapping table, and performs a deduplication process regarding the incoming data based on the determination result.

2. The system of claim 1, wherein the server is configured to delete the duplicated copy of the incoming data in the storage device, if the meta data is duplicate.

3. The system of claim 1, wherein the storage device includes:
a hash engine configured to calculate the hash value for the incoming data; and
a storage configured to store the incoming data and the meta data.

4. The system of claim 3, wherein the storage device includes a solid state drive (SSD).

5. The system of claim 1, wherein the storage device includes:
a primary storage device configured to store the incoming data; and
a secondary storage device including:
a hash engine configured to calculate the hash value for the incoming data; and
a storage configured to store the meta data.

6. The system of claim 5, wherein the secondary storage device includes a non-volatile random access memory (NVRAM) card configured to be mounted on the server.

7. A method comprising:
providing, by a server, an incoming data to at least one storage device;
storing, by the storage device, the incoming data;
calculating, by the storage device, a hash value for the incoming data;
storing, by the storage device, the hash value as meta data;

reading, by the server, when a later-scheduled post-deduplication operation is to be performed, as part of the later-scheduled post-deduplication operation, the meta data from the storage device;
determining, by the server, whether the meta data is duplicate in a mapping table maintained by the server; and
performing, by the server, a deduplication process regarding the incoming data based on the determination result.

8. The method of claim 7, wherein performing of the deduplication process comprises deleting the duplicated copy of the incoming data in the storage device, if the meta data is duplicate.

9. The method of claim 7, wherein the storage device includes a solid state drive (SSD).

10. The method of claim 7, wherein the storage device includes:
a primary storage device configured to store the incoming data; and
a secondary storage device including:
a hash engine configured to calculate the hash value for the incoming data; and
a storage configured to store the meta data.

11. The method of claim 10, wherein the secondary storage device includes a non-volatile random access memory (NVRAM) card configured to be mounted on the server.

12. A storage server comprising:
a receiver and interface assembly configured to:
receive an incoming data; and
provide the incoming data to at least one storage device external to the storage server, and
a processor configured to:
read meta data as a hash value for the incoming data from the storage device when a later-scheduled post-deduplication operation is to be performed, as part of the later-scheduled post-deduplication operation;
determine whether the meta data is duplicate in a mapping table; and
perform a deduplication process regarding the incoming data in the storage device based on the determination result.

13. The server of claim 12, wherein the processor is configured to delete the duplicated copy of the incoming data in the storage device, if the meta data is duplicate.

14. The server of claim 12, wherein the storage device includes a solid state drive (SSD).

15. A storage server comprising:
an internal storage device mounted on the server, configured to store an incoming data, calculate a hash value for the incoming data, and store the hash value as meta data; and
a processing unit configured to read the meta data from the internal storage device when a later-scheduled post-deduplication operation is to be performed, as part of the later-scheduled post-deduplication operation, determining whether the meta data is duplicate in a mapping table, and performing a deduplication process regarding the incoming data based on the determination result.

16. The server of claim 15, wherein the processing unit is configured to delete the duplicated copy of the incoming data in the internal storage device, if the meta data is duplicate.

17. The server of claim 15, wherein the processing unit is configured to provide the incoming data to at least one external storage device, if the meta data is non-duplicate.

18. The server of claim 15, wherein the internal storage device includes:
a hash engine configured to calculate the hash value for the incoming data; and
a storage configured to store the incoming data and the meta data.

19. The server of claim 18, wherein the internal storage device includes a non-volatile random access memory (NVRAM) card configured to be mounted on the server.

* * * * *